Dec. 13, 1966  W. S. BACHMAN  3,290,726
PHONOGRAPH RECORD MOLDING APPARATUS
Filed April 22, 1964

INVENTOR.
WILLIAM S. BACHMAN
BY
Brumbaugh, Free, Graves & Donohue
his ATTORNEYS

United States Patent Office 3,290,726
Patented Dec. 13, 1966

3,290,726
PHONOGRAPH RECORD MOLDING APPARATUS
William S. Bachman, Southport, Conn., assignor to Columbia Broadcasting System, Inc., New York, N.Y., a corporation of New York
Filed Apr. 22, 1964, Ser. No. 361,842
11 Claims. (Cl. 18—5.3)

This invention relates to molding apparatus and, more particularly, to an improved mold for use in producing phonograph records or the like.

Phonograph records are generally porduced by compressing a thermoplastic material between two molds. Usually one mold is fixed and the other may be reciprocated into and out of engagement with the first. Each mold is a heavy cored structure into which steam and water are introduced as required in the molding cycle. The engaging surfaces of the two molds are recessed or contoured to the approximate shape of a record, but the final shape and program information are impressed upon the thermoplastic material by means of a thin metal matrix which covers the recessed portion of the mold. Each matrix is coined, or drawn to shape, in a die-set prior to installation on the mold. It is usual that the coining does not, and probably cannot, very closely approach the contour of the mold to which it is to be fitted. The degree of coining is influenced by the thickness of the matrix, its ductility, the available force for the die and the condition of the coining tools. Furthermore, the strains imposed upon the matrix in coining often fracture or embrittle the matrix, causing early failure in use.

Another difficulty has been encountered in prior art record molding techniques in clamping the matrix to the mold. This problem is especially acute at the periphery of the recessed portion of the mold. Inasmuch as the thermoplastic material is required to register the finest details of the surface of the matrix, it is difficult to prevent the material from entering even the slightest crack. To avoid the possibility of the plastic material entering behind the matrix, i.e. between the matrix and the mold, it is general practice to carry the matrix across the recessed portion, over the "pinching area" (the engaging surface surrounding the recessed portion) and outside of the mold (i.e. beyond the pinching area). The "pinching off" of the thermoplastic material is therefore effected by the cooperating surfaces of the matrices just outside of the diameter to which the record is trimmed. Because of the irregularity of the constriction so provided, some sectors are subjected to higher molding pressures than others, and much difficulty is experienced in the form of warped records or "non-fills." The latter are many minute air inclusions which cause discontinuities in the surface of the grooves, resulting in clicks or rattles in the reproduced program information.

The center of the matrix is conventionally clamped to the mold by a disc, the periphery of which overlies the inner edge of the matrix. The disc is mounted at its center on a shaft which may be secured to the mold. This prior art clamping arrangement leaves an empty space between the clamping disc and the mold, and so the transmission of heat to the thermoplastic material at the center of the mold is relatively poor.

Accordingly, it is an object of the present invention to overcome the above-mentioned difficulties of conventional phonograph record molding apparatus.

Another object of the invention is to provide a novel mold for producing phonograph records that is adapted to receive a matrix which is not coined at its outside edge.

A further object of the invention is to provide an improved record producing mold in which the "pinching off" of the thermoplastic material is accomplished in a uniform fashion by a surface of the mold itself.

Still another object of the invention is to provide an improved phonograph record molding appartus in which a matrix may be mounted in self-sealing relation to the apparatus at the center and rim of the matrix.

These and other objects and advantages of the invention are attained by providing a mold adapted to receive the entire matrix within its recessed portion, the matrix being clamped in an improved manner at its center to the mold and the matrix rim being supported on an inclined surface in the recessed portion. Simple sealing means are provided at the center of the matrix for preventing the thermoplastic material from entering the clamping assembly.

All of the above is more fully explained in the detailed description of a preferred form of the invention which follows, this description being illustrated by the accompanying drawings wherein.

Figure 2:
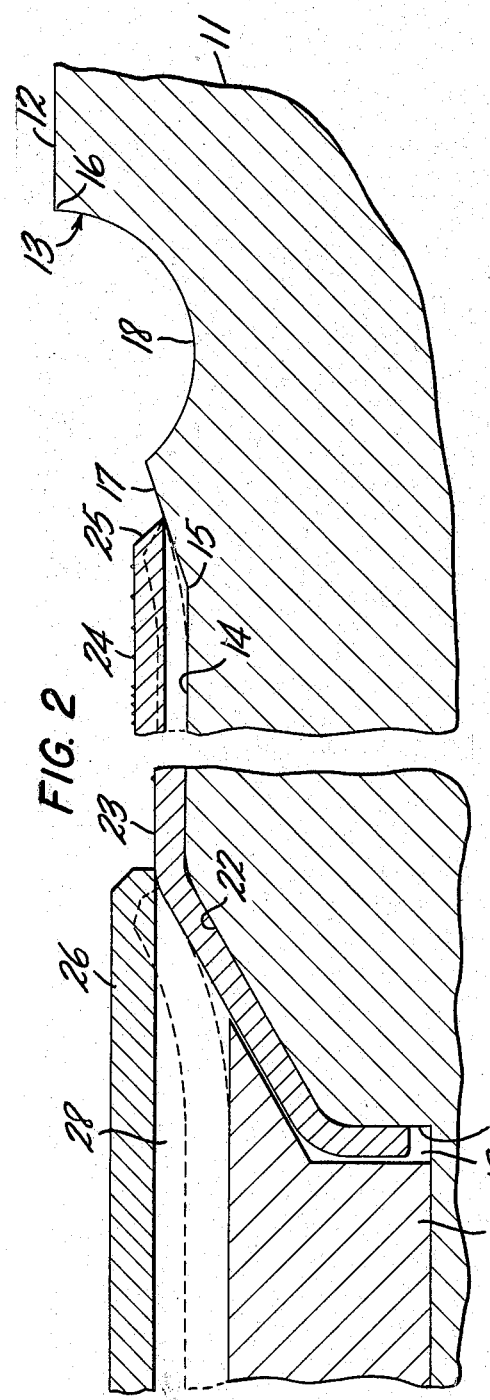
FIG. 2 is an enlarged fragmentary view in section taken along the line 2—2 of FIG. 1.
Figure 1:
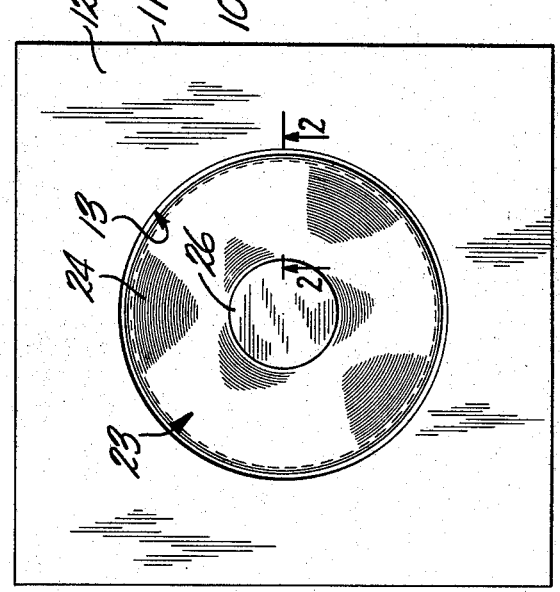
FIG. 1 is a plan view of a typical mold for producing phonograph records embodying the present invention, a matrix being clamped thereon.

In the representative embodiment of the invention shown by way of example in the drawings, a phonograph record molding apparatus 10 comprises two molds 11 and 11' disposed in opposed spaced relation to each other. One mold is fixed while the other may be reciprocated into and out of engagement with the fixed mold, in accordance with techniques well known in the art. For simplicity, FIGS. 1 and 2 show only the mold 11, it being understood that the mold 11' would be contoured or recessed exactly as illustrated in FIG. 2. It is to be understood that the following detailed description of the mold 11 is equally descriptive of the mold 11'.

The mold 11 has a substantially planar surface 12, in which is formed a molding recess or cavity 13. The two recesses 13 and 13' are coaxial, and when the two molds 11 and 11' are in engagement, the surfaces 12 and 12', respectively, engage one another. Each mold contains internal passageways (not shown) into which steam and water may be introduced as required in the molding cycle. A matrix receiving area in the recess 13 includes a substantially flat or planar face 14 having a circular periphery 15 concentric with the periphery 16 of the recess 13. An inclined surface 17 extends from the periphery 15 of the face 14 upwardly and outwardly generally toward the periphery 16 of the recess 13. The mold 11 is preferably formed with an annular concave surface 18 between the inclined surface 17 and the recess periphery 16 for reasons to be explained hereinafter.

A central cavity 19 receives a matrix clamping member 20, which may be secured to the mold 11 by suitable means such as screws (not shown), for example. The lateral wall of the cavity 19 includes a vertical wall 21 and an upwardly inclined surface 22 which extends to the beginning of the planar face 14.

As best seen in FIG. 2, a matrix 23 having a substantially circular periphery may be releasably secured at its center portion to the mold 11 by the clamp 20. It should be noted that the clamp and the central portion of the matrix occupy substantially the entire volume of cavity 19 except for a space 28 to be discussed presently. The matrix is preferably of nickel and contains the program information to be impressed on the phonograph record produced from the mold on a spiral rib 24 protruding from the upper surface of the matrix. When the matrix is so clamped, the lower edge of the matrix rim 25 engages and is supported by the inclined surface 17, so that the under surface of the matrix 23 is largely out of contact with the face 14 of the mold 11.

A sealing disc 26 is disposed across the central cavity 19, the disc being supported generally at its periphery by the portion of the matrix 23 opposite the inner edge of the face 14. The disc is preferably of steel shim stock and may have a thickness of 10 mils, for example. An adhesive material, although not necessary, may be applied to the mutually-engaging surfaces of the disc and the matrix if desired. The clamping member 20 occupies only the lower portion of the cavity 19, so that when the disc 26 is in its normal or unflexed position (indicated in full lines in FIG. 2), there is a space 28 between the disc and the clamping member.

To produce a phonograph record, suitable thermoplastic material is introduced between the molds by any suitable means. Then the upper mold, for example, is reciprocated into engagement with the lower mold, whereupon the plastic material is compressed between the two matrices secured to the two molds. When the plastic material is so compressed, the matrix 23 is flexed or forced downwardly so that its inner or central portion rests on the face 14 as shown in dotted lines in FIG. 2. However, since the matrix rim 25 lies on the upwardly inclined surface 17 the outer periphery of the matrix is flexed upwardly, so that there is a generally circular line of high pressure contact between the matrix rim 25 and the inclined surface 17.

Figure 3:
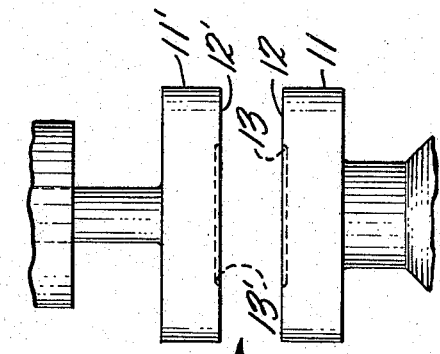
FIG. 3 is a simplified elevational view of a phonograph record molding apparatus including two of the molds of FIG. 1.

When the opposed surfaces 12 and 12' of the two molds (see FIG. 3) are in engagement and the excess flow of the plastic material is "pinched off" therebetween, the contact pressure along the line of contact defined by the lower edge of the rim 25, resulting from the pressure of the plastic material upon the outer portion of the matrix which is not in contact with the mold, is necessarily substantially greater than the pressure exerted by the plastic material on the upper surface of the matrix. The junction between the matrix rim 25 and the inclined surface 17 is therefore self-sealing, whereby the plastic material is prevented from entering behind the matrix 23, i.e. between the matrix and the mold.

Similarly, when the plastic material is compressed, the sealing disc 26 is forced down against the clamp 20 as shown in dotted lines in FIG. 2. It can be seen that the matrix 23 is clamped against the inclined surface 22 of the mold and the upper surface of the clamp 20 is generally planar and parallel with, but displaced below, the face 14 and thus the upper surface of the matrix, whereby a space 28 is provided into which the sealing disc 26 may be flexed. In this way, a ring of high contact pressure is developed between the outer edge of the sealing disc and the matrix, providing a self-sealing junction therebetween, whereby plastic material is prevented from fouling the clamp 20. Both the sealing disc and the matrix are flexed as illustrated with each molding cycle, i.e. each time a record is produced; however, the material and thickness may be readily selected so that overstraining does not occur.

When the plastic material is compressed and the sealing disc 26 is pressed against the clamp 20, it can be readily seen that there is essentially no empty space between the mold and the thermoplastic material in the vicinity of the clamp 20. Thus there is excellent transmission of heat from the mold to this portion of the plastic material, in contradistinction to the center clamping arrangements of the prior art.

The peripheral concave surface 18 has no functional relation with the self-sealing junction between the matrix rim and the mold but is provided to form a round bead at the rim of the finished record. If the inclined surface 17 were extended to the outside surface 12, the finished record would have a very sharp-edged rim, and so an extra trimming step would be required to prevent injury to a person handling the record.

In a practical structure, the circular periphery 15 may have a diameter of 11.740 inches, the matrix 23 a diameter of 11.770 inches, the periphery 16 a diameter of 11.907 inches, the concave surface 18 a radius of curvature of 0.032 inch, and the inclined surface 17 may extend at an angle of 161.5° from the planar face 14. The vertical wall 21 may have a diameter of 3.874 inches, and the clamping member 20 may have a thickness of 0.045 inch. The diameter of the inner edge of the face 14, i.e. the common edge of the inclined surface 22 and the face 14, may be 4.00 inches.

The present invention avoids the prior art difficulties mentioned above because the entire matrix is mounted within the recess 13. Coining of the matrix rim is unnecessary, and so this cause of matrix failure prevalent in conventional record molding apparatus is eliminated. Furthermore, the "pinching off" of the plastic material is accomplished without the aid of the matrix by the surface 12 of the mold, and this surface may be machined to any desired degree of precision by conventional techniques, so that the plastic material is pinched uniformly. Therefore the warping and surface discontinuities of records produced by prior art devices are avoided. Moreover, by securing the matrix to the mold in the manner described above, the transmission of heat between the central portion of the mold and the molding material is improved while the matrix is maintained in self-sealing relation to the molding apparatus at both its center and its rim.

While the fundamental novel features of the invention have been shown and described, it will be understood that various substitutions, changes and modifications in the form and details of the apparatus illustrated and its manner of operation may be made by those skilled in the art without departing from the scope or spirit of the invention. All such variations and modifications, therefore, are included within the intended scope of the invention as defined by the following claims.

I claim:
1. In a phonograph record molding apparatus, the combination of
   a mold having a matrix receiving area bounded by an upwardly and outwardly inclined surface disposed below and inwardly of an outer annular pinching surface, and
   a matrix disposed with only its outer rim supported by the inclined surface, thereby providing space between the matrix and the outer matrix receiving area inwardly of the inclined surface.

2. In a phonograph record molding apparatus, the combination of
   a mold having a matrix receiving area provided with a central cavity therein,
   a matrix positioned at said area and having a central, downwardly depending portion adapted to extend into the cavity,
   clamping means in the cavity for releasably securing the central portion of the matrix therein, and
   a resilient sealing disc disposed with its periphery supported by the matrix so as to form a sealed closure for the cavity.

3. In a phonograph record molding apparatus, the combination of
   a mold having a central cavity therein surrounded by a matrix receiving area bounded by an upwardly and outwardly inclined surface,
   a matrix disposed with its periphery supported by the inclined surface and having a central, downwardly depending portion extending into the mold cavity,
   clamping means in the cavity for releasably securing the central portion of the matrix therein, and
   a resilient sealing disc disposed with its periphery supported by the matrix so as to form a sealed closure for the cavity.

4. Apparatus for molding phonograph records comprising:
two opposed molds in spaced relation to each other, each of the molds having a surface adjacent the other mold, at least one mold adapted to be reciprocated into and out of engagement with the other mold, the two adjacent surfaces engaging one another when the two molds are in engagement,
a recess means being formed in each of the adjacent surfaces, the recess means including a matrix receiving area bounded by an upwardly and outwardly inclined surface adapted to support the periphery of a matrix, including a matrix disposed with its periphery supported by the inclined surface with space between the matrix and the outer matrix receiving area inwardly of the inclined surface, and clamping means at the center of the recess means for releasably securing the central portion of the matrix to the mold.

5. Apparatus for molding phonograph records comprising:
two opposed molds in spaced relation to each other, each of the molds having a surface adjacent the other mold, at least one mold adapted to be reciprocated into and out of engagement with the other mold, the two adjacent surfaces engaging one another when the two molds are in engagement,
a recess means being formed in each of the adjacent surfaces, the recess means including a matrix receiving area bounded by an upwardly and outwardly inclined surface adapted to support the periphery of a matrix, the recess means including a concave surface surrounding the inclined surface for molding the outer rim of a finished phonograph record.

6. Apparatus for molding phonograph records comprising:
two opposed molds in spaced relation to each other, each of the molds having a surface adjacent the other mold, at least one mold adapted to be reciprocated into and out of engagement with the other mold, the two adjacent surfaces engaging one another when the two molds are in engagement,
a recess means being formed in each of the adjacent surfaces, the recess means including a matrix receiving area bounded by an upwardly and outwardly inclined surface adapted to support the periphery of a matrix, a matrix disposed with its periphery supported by the inclined surface, clamping means at the center of the recess means for releasably securing the central portion of the matrix to the mold, the clamping means being disposed in a central cavity formed in the matrix receiving area, and including a resilient sealing disc disposed with its periphery supported by the matrix secured to the mold so as to form a sealed closure for the cavity.

7. A mold for use in producing phonograph records adapted to be used with a matrix comprising:
a planar surface, and
a molding recess means in the planar surface adapted to receive the matrix, the recess means having a substantially flat face parallel with the planar surface, the flat face being bounded by an upwardly and outwardly inclined surface adapted to support the periphery of the matrix, and the inclined surface being bounded by a concave surface for molding the outer rim of a finished phonograph record.

8. Apparatus according to claim 7 in which the molding recess means includes a central cavity, and also including a matrix disposed with its periphery supported by the inclined surface, and clamping means disposed in the central cavity for releasably securing the central portion of the matrix to the mold.

9. A molding apparatus for producing phonograph records adapted to be used with a matrix having an outer rim of substantially circular periphery comprising:
a mold having a planar surface and a molding recess in the planar surface having a substantially circular periphery of radius greater than that of the matrix, the molding recess including an upwardly and outwardly inclined surface disposed below and inwardly of the outer planar surface; adapted to support only the outer rim of the matrix, thereby providing space between the matrix and the outer matrix receiving area of the recess inwardly of the inclined surface.

10. The combination according to claim 3, in which the upper surface of the clamping means is disposed below the matrix receiving area to provide a space into which the resilient sealing disc may be flexed.

11. Apparatus according to claim 9 including a matrix disposed with its periphery supported by the inclined surface, and clamping means at the center of the recess for releasably securing the central portion of the matrix to the mold.

References Cited by the Examiner

UNITED STATES PATENTS

| | | | |
|---|---|---|---|
| 847,338 | 3/1907 | Hoyt | 18—5.3 |
| 1,190,072 | 7/1916 | Aiken | 18—5.3 X |
| 1,372,992 | 3/1921 | Beadle | 18—5.3 |
| 1,399,817 | 12/1921 | Steventon | 18—5.3 |
| 1,447,183 | 3/1923 | Roberts | 18—5.3 X |
| 1,552,647 | 9/1925 | Roberts | 18—5.3 |
| 1,576,642 | 3/1926 | Bishop | 18—5.3 |
| 1,642,755 | 9/1927 | Ward | 18—5.3 X |
| 2,491,068 | 12/1949 | Adams | 18—5.3 |
| 2,839,306 | 6/1958 | Bayless | 18—5.3 X |
| 2,850,785 | 9/1958 | Rushing | 25—120 X |
| 3,018,513 | 1/1962 | Adams et al. | 18—5.3 |
| 3,236,132 | 2/1966 | Goulet et al. | 18—5.3 X |

J. SPENCER OVERHOLSER, *Primary Examiner.*

J. HOWARD FLINT, JR., *Examiner.*